Sept. 4, 1945.　　　　C. C. BELL　　　　2,384,005
BEARING ASSEMBLY
Filed Dec. 30, 1943
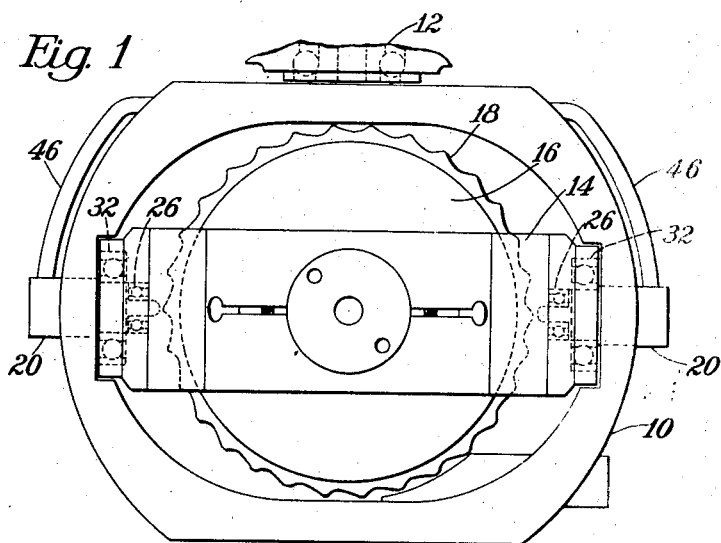
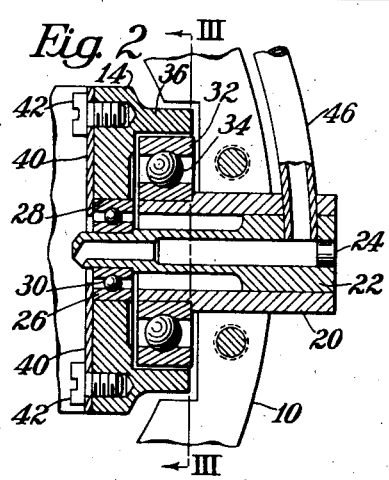
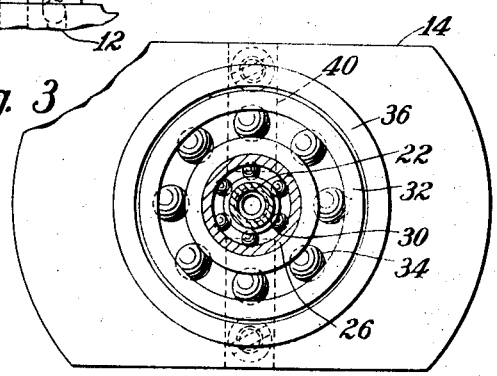
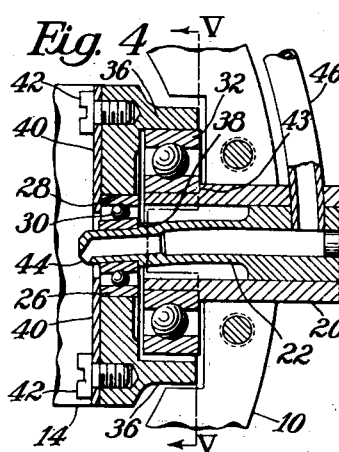
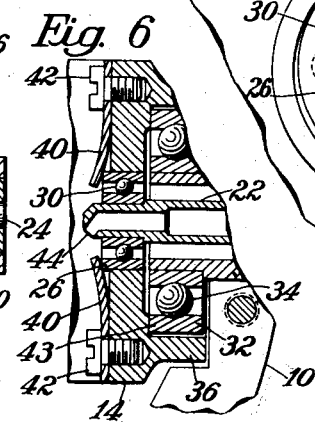
Inventor
Charles C. Bell
By his Attorney Patented Sept. 4, 1945

2,384,005

UNITED STATES PATENT OFFICE 2,384,005

BEARING ASSEMBLY

Charles C. Bell, Marblehead, Mass., assignor to United Shoe Machinery Corporation, Flemington, N. J., a corporation of New Jersey Application December 30, 1943, Serial No. 516,305

8 Claims. (Cl. 74—5)

This invention relates to mountings for rotatable members and more particularly to bearings for rotatably supporting a member with a minimum of frictional resistance while providing adequate support for the member under forces acting normal to its axis of rotation. While the invention is not thus restricted in its application, it is illustrated herein as embodied in the bearings supporting the gimbal of a gyroscope.

Gyroscopes are commonly employed in mechanisms for controlling the course of a movable body, such as a torpedo, in its passage through water to a target toward which it is directed. In such mechanisms the inner gimbal of the gyroscope is normally disposed horizontally in space within the torpedo by the outer gimbal which is mounted in vertical anti-friction bearings, the inner gimbal being mounted in the outer gimbal by horizontally disposed anti-friction bearings. Any deviation of the torpedo from its course after it has started toward the target results in movement of the torpedo relatively to the outer gimbal, causing the actuation of suitable mechanism to operate the course control rudder in a manner to return the torpedo to its course. Between the time of launching the torpedo and the time when it reaches its desired depth and becomes substantially stable at that depth the torpedo may undergo rapid and substantial changes in its angles of declination and inclination. It is important that these changes should take place without affecting the horizontal position of the inner gimbal of the gyroscope in space but unless the friction in the inner gimbal bearings is kept at an extremely low value the changes in the vertical movements of the torpedo may cause the inner gimbal to follow the torpedo to a slight extent. Such movement of the inner gimbal even though slight, will cause precession of the gyroscope about the vertical axis of the outer gimbal, the result being a change in the relative positions of the torpedo and the outer gimbal so that the rudder control mechanism operates as if the torpedo had deviated from its course. Thus, the course control rudder may be shifted at a time when the torpedo is on its true course resulting in a false correction and causing the torpedo to follow an incorrect course.

The above condition may be corrected by the employment of ball bearings for supporting the inner gimbal, the balls of which are of such small diameter that the friction of the inner gimbal supports is extremely low. However, the employment of such bearings presents another difficulty. Normally, the load on the bearings is sufficiently small to permit the employment of very small bearings but at the time of launching the torpedo the bearings are momentarily subjected to a heavy shock load. For this reason it has heretofore been the practice to provide bearings the balls of which are of sufficient size to absorb the maximum shock load and, accordingly, bearings of considerably larger size than would otherwise be required have been employed with the attendant possibility that precession of the torpedo may take place due to the frictional drag of the bearings, thus causing a false course correction as discussed above.

An object of the present invention is to provide a bearing assembly for a rotatable member of such a character that the member being supported is normally carried by very small bearings but in which provision is made to relieve these bearings of any momentary shock load. To this end and in accordance with a feature of the invention the assembly comprises two sets of anti-friction bearings, a set of small bearings having small diameter bearing members and a set of large bearings having relatively large bearing members. The normal load on the rotatable member is taken by the small bearings, the larger bearings normally being ineffective, but upon the application of an abnormal radial load on the rotatable member the large bearings become effective to support the rotatable member, thereby limiting the load which may be imposed on the small bearings. This is accomplished in accordance with the present invention by mounting the small bearings on cantilevers which will bend under the application of a heavy radial load on the rotatable member until the rotatable member rests upon the larger bearings, which are normally concentrically disposed with respect to the small bearings and are out of contact with the rotatable member.

In accordance with another feature the invention provides a mounting for a gimbal of a gyroscope in which small ball bearings normally support the gimbal, the bearings being carried by cantilevers providing a yielding mounting therefor, whereby any abnormal loading on the gimbal is transferred to larger bearings which are ineffective during the normal operation of the gyroscope. The cantilevers are in the form of tubes providing passageways for impelling fluid to drive the rotor of the gyroscope.

In accordance with still another feature of the invention the small ball bearings normally act as thrust bearings for the rotatable member. The rotatable member is normally carried by the small bearings against endwise movement relatively thereto in spaced relation to the large ball bearings but provision is made for permitting endwise movement of the rotatable member relatively to the small bearings in response to an excessive axial force on the rotatable member whereupon it moves into engagement with and the force is absorbed by one of the large ball bearings.

The above and other features of the invention, including various details of construction and novel combinations of parts will now be described in detail with reference to the accompanying drawing and pointed out in the claims.

In the drawing,

Fig. 1 is a side elevation of a gyroscope in which the inner gimbal is supported by bearing assemblies constructed in accordance with the present invention;

Fig. 2 is a vertical section through one of the bearing assemblies for the inner gimbal;

Fig. 3 is a section on the line III—III of Fig. II;

Fig. 4 is a view similar to Fig. 2 but showing the relative positions of the parts in response to the application of an abnormal load on the inner gimbal, the shift in positions of the parts being exaggerated for clarity;

Fig. 5 is a section on the line V—V of Fig. 4; and

Fig. 6 is a view similar to Fig. 2 but showing the positions of the parts under the influence of an axial force applied to the inner gimbal.

The invention illustrated herein is embodied in a gyroscope comprising an outer, vertically disposed gimbal 10 rotatably mounted in bearings 12, an inner, horizontally disposed gimbal 14 rotatably mounted by means to be described, in the outer gimbal 10, and a rotor 16 mounted for rotation in the inner gimbal about a horizontal axis normal to the axis of rotation of the gimbal 14. The rotor 16 is provided on its periphery with vanes 18 to receive a blast of gas under pressure to cause rotation of the rotor at high velocity, as will be described.

Mounted at diametrically opposite points in the gimbal 10 are sleeves 20 in each of which is mounted a tube 22 closed at its outer end by a plug 24. The inner end portion of the tube is reduced in diameter to space it from the sleeve 20 and to form a yieldable cantilever support for a small ball bearing 26. The outer race of the ball bearing 26 is received by an aperture 28 in the inner gimbal 14 so that the inner gimbal is normally supported by a pair of ball bearings the bearing members 30 of which, as shown, are of such relatively small diameter as to reduce the frictional resistance of the gimbal to turning to a very small amount. The cantilever support for the ball bearings 26 permits a slight movement of the inner gimbal transversely to its axis of rotation in the event that it is subjected to an appreciable force acting normal to its axis of rotation.

Mounted on the sleeves 20 between the small ball bearings 26 and the adjacent portion of the outer gimbal 10 are large ball bearings 32 provided with balls 34 which are relatively large as compared with the balls 30 of the bearings 26. Projecting outwardly from opposite sides of the gimbal 14 are circular flanges 36 which surround the large bearings 32 and are normally slightly spaced therefrom, as illustrated in Fig. 2, so that these bearings are normally ineffective to support the inner gimbal 14. In the event that the inner gimbal is subjected to an abnormal load normal to its axis of rotation the flexing of the cantilever supports for the small ball bearings will cause the flange 36 to engage the large bearings 32 as indicated in Fig. 4, which thereby absorb the greater part of the load on the gimbal and thus limit the load applied to the small bearings 26. Hence, it is possible normally to support the inner gimbal on bearings which are of sufficient size to withstand normal loading on the gimbal but are not sufficiently large to withstand any abnormal loading. In actual practice the spacing between the flange 36 and the large bearing 32 may be very small, of the order of .002 inch for example, so that a very slight flexing of the cantilevers will cause the large bearings to assume the load on the inner gimbal. It will be understood that in the illustrations in Figs. 2 and 4 the space between the flange 36 and the bearing 32, and the bending of the cantilevers are exaggerated merely for purposes of illustration.

The small bearings 26 also act as thrust bearings for the inner gimbal, but the inner gimbal is mounted for yielding movement relatively thereto in the event of any abnormal end thrust on the inner gimbal. These bearings are received between shoulders 38 on the cantilevers 22 and bars 40 secured to the inner portion of the gimbal 14 by screws 42. These bars engage the outer races of the small bearings 26 and are capable of yielding slightly, as indicated in Fig. 6, in the event of any abnormal end thrust on the inner gimbal which the small bearings would be incapable of absorbing. Upon such yielding of the bars 40, the gimbal engages the outer race of one of the large bearings 32 the inner race of which engages a shoulder 43 on the cantilever 22. Thus the large bearings absorb abnormal thrust loads on the inner gimbal as well as abnormal radial loads, thereby obviating the possibility of destruction of the small bearings by which the inner gimbal is normally supported.

The tubes 22 which support the small bearings 26 provide for the passage of compressed air or any other suitable operating fluid to be directed to the rotor 16 to cause its rotation. These tubes have outlet ports 44 arranged at an angle to the axes of the tubes to direct the air at the proper angle on the vanes 18 on the rotor, the outer ends of the tubes being connected by pipes 46 to a source of compressed air.

From the above it will be seen that the inner gimbal is normally mounted on the small ball bearings 26 thereby minimizing the frictional resistance of rotation, the supports for these small bearings being provided by the cantilevers 22 which permit yielding movement of the bearings in response to a force acting on the gimbal normal to its axis of rotation. The clearance between the inner gimbal and the large bearings 32 is so small that upon a slight yielding movement of the cantilevers, the large bearings 32 become effective to support the gimbal, thereby limiting the load applied to the small bearings. When the gyroscope is used in connection with the course control mechanism of a torpedo this abnormal force is of slight duration at the time of launching the torpedo after which the cantilevers assume their normal positions as shown in Fig. 2 and the gimbal is supported solely by the small bearings 26, the frictional resistance to rotation of which is so slight that there is no tendency of the inner gimbal to be moved out of its normal horizontal plane as the torpedo changes its depth in the water.

While the bearing assembly has been described particularly in connection with a gyroscope, it will be obvious that it may be used in the mounting of any rotatably mounted member where it is desired normally to maintain the frictional drag on the member at an extremely low value, but providing supplemental support for the member to absorb abnormal forces acting thereon.

Having thus described my invention, what I claim as new and desire to secure by Letters Patent of the United States is:

1. In combination, a supporting member, an element rotatably carried thereby, small ball bearings by which said element is carried by said supporting member, means mounting said ball bearings in said supporting member for yielding movement normal to the axis of rotation of said element, large ball bearings carried by said supporting member adjacent to said small ball bearings, and means carried by said element normally concentric with and surrounding said large ball bearings in spaced relation thereto but being arranged to receive support from the large ball bearings upon movement of the small ball bearings in response to a force acting on said element transversely of its axis of rotation.

2. In combination, a supporting member, an element rotatably carried thereby, small ball bearings by which said element is carried by said supporting member, cantilevers carried by said supporting member and supporting said ball bearings for yielding movement normal to the axis of rotation of said element, large ball bearings carried by said supporting member outwardly of said small ball bearings, and means rigid with said element normally concentric with and surrounding said large ball bearings in spaced relation thereto, said means being arranged to be supported by said large ball bearings upon yielding movement of said small ball bearings.

3. In a gyroscope having an outer gimbal and an inner gimbal, means rotatably supporting said inner gimbal from said outer gimbal comprising small ball bearings carried by the outer gimbal for yielding movement relatively to the axis of rotation of the inner gimbal, large ball bearings carried by the outer gimbal outwardly of said small ball bearings, said inner gimbal having portions surrounding said large ball bearings in spaced relation thereto but being arranged to be supported by said large ball bearings upon yielding movement of said small ball bearings in response to a force acting on the inner gimbal transversely of its axis of rotation.

4. In a gyroscope having an outer gimbal and an inner gimbal, means supporting said inner gimbal for rotation from said outer gimbal comprising a pair of small ball bearings, inwardly extending cantilevers carried by said outer gimbal and supporting said small ball bearings for yielding movement transversely of the axis of rotation of the inner gimbal, large ball bearings carried by said outer gimbal outwardly of said small ball bearings and fixed in positions concentric with the normal positions of the small ball bearings, and flanges on said inner gimbal surrounding said large ball bearings in spaced relation thereto, said flanges being arranged to be supported by said large bearings upon yielding movement of said small ball bearings in response to a force acting on said inner gambal normal to its axis of rotation.

5. In a gyroscope having an outer gimbal, an inner gimbal rotatable within the outer gimbal, and a rotor carried by the inner gimbal, small ball bearings acting normally to support the inner gimbal from the outer gimbal, cantilevers carried by the outer gimbal and supporting said small ball bearings for yielding movement normal to the axis of rotation of the inner gimbal, said cantilevers having passageways therethrough providing for the admission of an impelling fluid to drive the rotor, large ball bearings carried by the outer gimbal between the small bearings and the gimbal, outwardly extending circular flanges carried by the inner gimbal and surrounding said large bearings in spaced relation thereto but being arranged to be supported thereon upon flexing of the cantilevers in response to a shock load on the gyroscope normal to the axis of rotation of the inner gimbal.

6. In combination, a supporting member, an element rotatably carried thereby, small ball bearings acting as combination journal and thrust bearings for said element, means mounting said ball bearings in the supporting member for yielding movement normal to the axis of rotation of said element, large ball bearings carried by said supporting member adjacent to said small ball bearings and normally out of contact with said element but arranged to act as journal bearings for said element upon movement of said element in response to an abnormal radial load thereon, and means mounting said element for axial movement relatively to said small bearings in response to an excessive axial load thereon, whereby the large bearings act as thrust bearings for said element.

7. In combination, a supporting member, an element rotatably carried thereby, small ball bearings by which said element is carried by said supporting member, cantilevers carried by said supporting member and supporting said ball bearings for yielding movement normal to the axis of rotation of said element, said cantilevers being provided with shoulders arranged to engage the inner races of said ball bearings to prevent outward movement of the ball bearings relatively to said element, large ball bearing members carried by said supporting member outwardly of said small ball bearings, said element having a portion normally concentric with and surrounding said large ball bearings in spaced relation thereto and arranged to be supported by said large ball bearings upon yielding movement of said small ball bearings, and yielding means carried by said element engageable with the outer races of said small ball bearings, whereby the element is normally supported against axial movement, said yieldably means permitting axial movement of said element in response to an excessive axial load thereon whereupon the element moves into engagement with one of the large ball bearings which absorbs the axial load on the element.

8. In a gyroscope having an outer gimbal and an inner gimbal, inwardly extending yieldable cantilevers carried by said outer gimbal and having reduced inner portions providing shoulders, small ball bearings carried by the reduced portion of the cantilevers the inner races of said bearings being engageable with the shoulders formed on the cantilevers, said inner gimbal being carried by the outer races of said small ball bearings for yielding movement transversely to the axis of rotation, large ball bearings carried by the outer gimbal outwardly of and in spaced relation to the small ball bearings and to the inner gimbal, said inner gimbal having portions arranged to be supported by said large ball bearings upon movement of the inner gimbal transversely of its axis of rotation, spring members carried by the inner gimbal engageable with the other races of the small ball bearings whereby the small bearings normally act as thrust bearings for the inner gimbal, said spring members permitting axial movement of the inner gimbal in response to an excessive thrust load whereupon the inner gimbal moves into engagement with one of the large bearings which absorbs the excessive thrust load.

CHARLES C. BELL.